May 6, 1924.

W. D. PENNINGTON ET AL 1,493,052

DYNAMO ELECTRIC MACHINE

Filed April 27, 1918    3 Sheets-Sheet 1

Witnesses:
W. F. Kilroy
Harry R. L. White

Inventors
William D. Pennington
John R. Pennington

May 6, 1924.
W. D. PENNINGTON ET AL
1,493,052
DYNAMO ELECTRIC MACHINE
Filed April 27, 1918     3 Sheets-Sheet 2
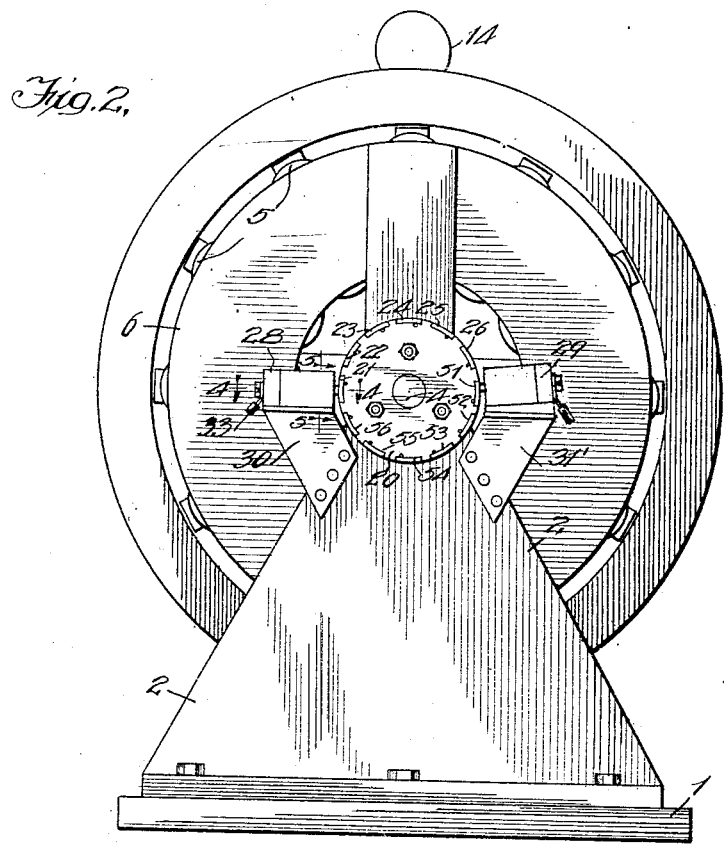
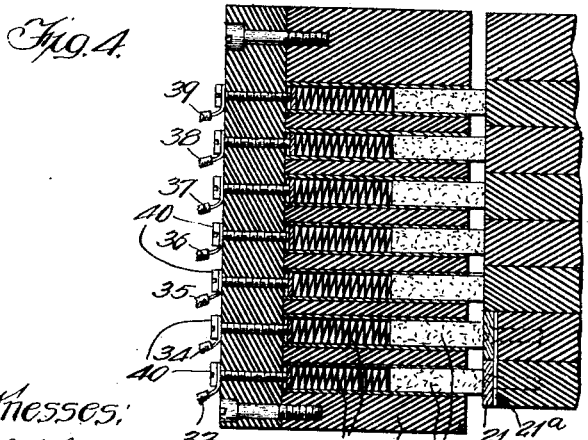
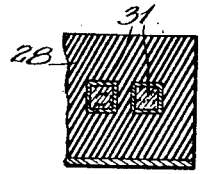

May 6, 1924.
W. D. PENNINGTON ET AL
1,493,052
DYNAMO ELECTRIC MACHINE
Filed April 27, 1918   3 Sheets-Sheet 3
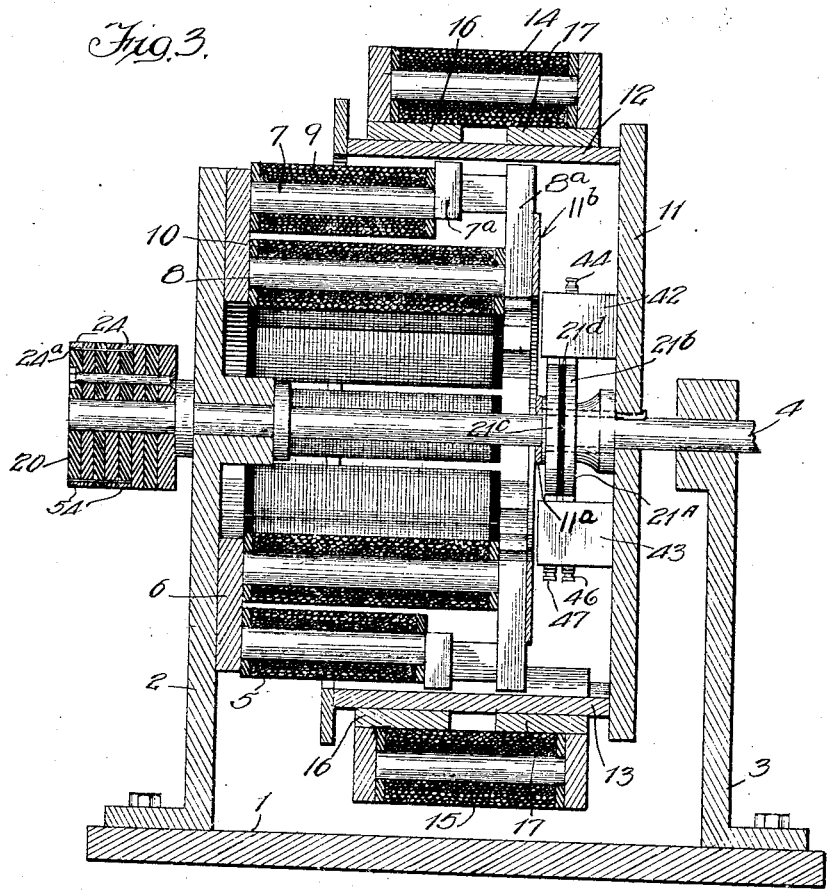
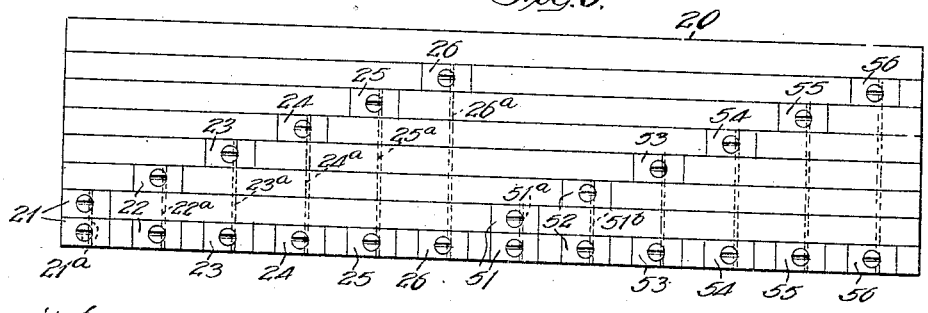
Witnesses:
W. F. Kilroy
Harry R. L. White
Inventors:
William D. Pennington
John R. Pennington
By A. Miller Belfield, Atty.

Patented May 6, 1924.

1,493,052

UNITED STATES PATENT OFFICE.

WILLIAM D. PENNINGTON AND JOHN R. PENNINGTON, OF CHICAGO, ILLINOIS.

DYNAMO-ELECTRIC MACHINE.

Application filed April 27, 1918. Serial No. 231,066.

*To all whom it may concern:*

Be it known that we, WILLIAM D. PENNINGTON and JOHN R. PENNINGTON, citizens of the United States, residing at Chicago, in the county of Cook and State of Illinois, have invented a certain new and useful Improvement in Dynamo-Electric Machines, of which the following is a full, clear, concise, and exact description, reference being had to the accompanying drawings, forming a part of this specification.

Our invention relates to dynamo electric machines, and especially to a dynamo electric machine adapted to be used as a motor.

The primary aim of the present invention is to provide an improved arrangement of the mechanical and electrical organizations of a device of the character referred to for increasing the efficiency of the machine by reducing to a minimum the sparking at the commutator present in all such devices, and to provide an outlet for such internal electrical disturbances as tend to overheat the windings, cause sparking at the commutator or set up eddy currents in the magnetic material of the machine.

Another aim of the invention is to simplify the construction and to secure a high degree of efficiency and advantageous application of the electrical energy, whether the machine is used as a generator or as a motor.

The above objects are accomplished by subjecting a secondary circuit of relatively high resistance to the counter flux set up in the motor windings, whereby the counter E. M. F. may be dispelled without creating high temperature or other undesirable results.

A more concrete understanding of our invention may be obtained from the following detailed description taken in connection with the accompanying drawings.

Fig. 2 is an end elevation of the same;

Fig. 3 is a vertical section taken on line 3—3 in Fig. 1;

Figure 1:
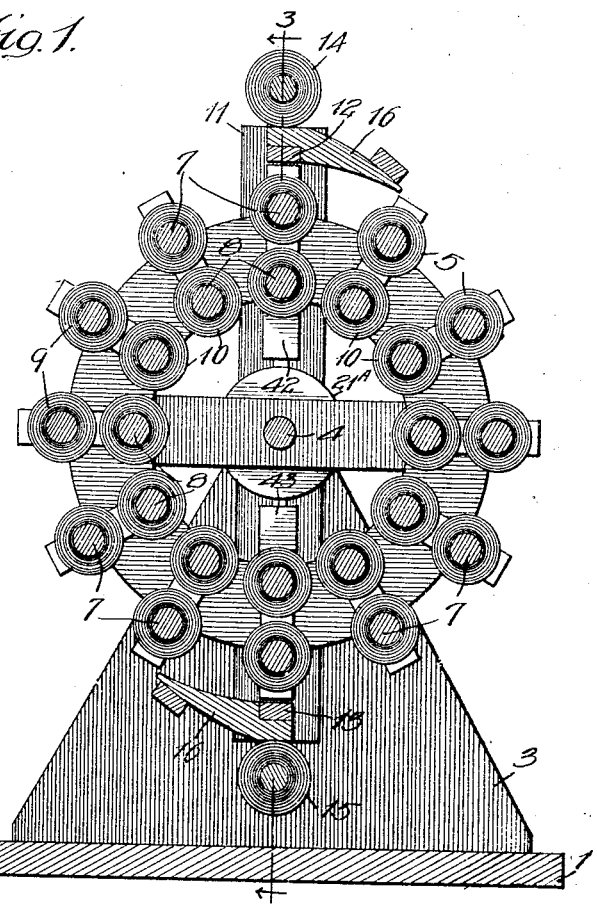
Fig. 1 is a transverse vertical section of a dynamo electric machine embodying our present invention.
Figure 7:
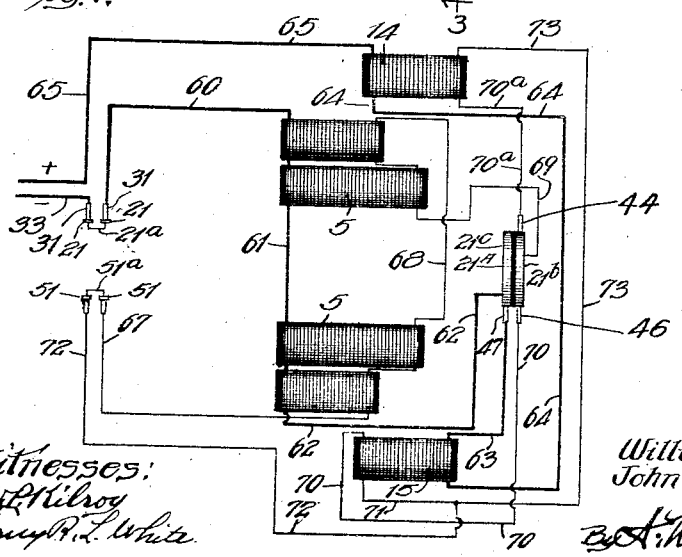

Figs. 4 and 5 are cross sections taken on lines 4—4 and 5—5, respectively, in Fig. 2 on an enlarged scale;

Fig. 6 is a view of the commutator projected on to a plain surface;

Fig. 7 is a diagrammatic view of the circuit connections.

Referring to the drawings, we show a dynamo electric machine having a base 1 with uprights or frame pieces 2 and 3 which support a rotary shaft 4. The stator or stationary member is mounted upon upright 2 and the rotor or rotary member is mounted on the rotary shaft 4.

The stator consists of a series of electromagnets 5—5 arranged in radial order with reference to the rotary shaft 4, said magnets being mounted upon a ring 6 of magnetic material secured to the upright 2. Each magnet 5 consists of two parts, a relatively short arm or member 7, and a relatively long arm or member 8, which said arms project from the ring 6 in a direction lengthwise of the rotary shaft 4. The members 7 and 8 have end pieces 7$^a$ and 8$^a$, respectively, which extend and point radially outward, as shown in Fig. 3, the outer end surfaces of said ends 7$^a$ and 8$^a$ being substantially the same distance from the center of the rotary shaft 4. Coils 9 and 10 are shown on the members 7 and 8, respectively. The ring 6 forms a yoke for these various electromagnets and the ends 7$^a$ and 8$^a$ form the poles thereof.

The rotor has a supporting member 11 mounted on the shaft 4 and also has two cross members 12 and 13 mounted on the yoke 11 and projecting from the same. These cross pieces 12 and 13 extend to and beyond the pole pieces 7$^a$ and 8$^a$ of the magnets 5, and are so located that when the rotor rotates said pieces 12 and 13 move around the magnets 5 in close proximity to the outer ends of the pole pieces 7$^a$ and 8$^a$. The members 12 and 13 are made of magnetic material. Electromagnets 14 and 15 are mounted upon the members 12 and 13, respectively. The coils 14 and 15 are provided with magnetic pole pieces 16 and 17 which are interposed between said coils and the cross pieces 12 and 13. These pole pieces 16 and 17 are located opposite the pole pieces 7$^a$ and 8$^a$ of the electromagnets 5.

It is intended that the electromagnets 5 shall be energized one after the other, when the device is used as a motor and that the electromagnets 14 and 15 shall be intermittently energized at such times as to permit their attraction by the magnets 5—5, one after the other, as the latter are successively energized, the magnets 14 and 15 being de-energized in the meantime so as to prevent their being held in position opposite any magnet 5 and to permit the magnets 14 and 15 to move by each magnet 5 after the latter have been energized and attracted the magnets 14 and 15. In this way rotary motion will be induced, the magnets 14 and 15 being attracted by the magnets 5—5, advancing to the latter one after the other so that the rotary member carrying said magnets 14 and 15 is impelled continuously forward in a circumferential direction.

In order to bring about this rotary movement and the proper energization and deenergization of the various magnets, the rotary shaft 4 is provided with a commutator 20 and a slip-ring device 21^A, the former for controlling the energization of the magnets 5, one after the other, and the latter for controlling the energization of the magnets 14 and 15. To such end the commutator 20 is provided with two contacts 21, two contacts 22, two contacts 23, and so on (Fig. 6). The two contacts 21 are side by side close together, and are connected by a connecting conductor 21^a. The two contacts 22 are separated from one another by a space equal to the width of one of the contacts 21, and are connected together by a conductor or strip 22^a. The two contacts 23 are side by side but separated from each other by a space equal to one of the contacts 21, and one contact 22. These contacts 23 are connected by a conductor or strip 23^a. In a similar manner the contacts 24, 25 and 26, are separated and connected together by conductors 24^a, 25^a and 26^a.

A commutator brush arrangement 28 is mounted at one side of the commutator 20 and is supported by brackets 30 and 31' on the upright member 2. This brush arrangement 28 has a series of contact brushes 31 adapted to cooperate with the contacts 21, 22, etc. Springs 32 are enclosed in the piston-like chambers in which the brushes 31 are confined and tend to push said brushes normally outward so as to cause their contact with the contacts 21, 22, etc. Connecting wires 33, 34, 35, 36, 37, 38 and 39 are connected with terminal screws 40 so that connection may be made through said screws 40 and springs 32 to the brushes 31.

The conductors 33, 34, etc. run to the electromagnets 5—5 so as to form separate energizing circuits therefor in accordance with the circuit connections illustrated in diagram in Fig. 7, which diagram will be explained hereinafter.

The collecting or slip-ring device 21^A is composed of two slip or collector rings 21^b and 21^c, insulated from each other at 21^d, this insulation serving also to insulate the rings from the shaft 4. This collector 21^A is stationarily mounted upon a support 11^a carried by the ring 11^b. Brush holders 42 and 43 are mounted on the member 11 and provided with brushes contacting with the slip-rings 21^b and 21^c; the brush holder 42 having brushes 44, and the brush holder 43 having brushes 46 and 47. Conductors are extended to these brushes 44, 46 and 47, in accordance with the diagram of Fig. 7 to be explained hereafter.

Before explaining the diagram of Fig. 7, it should be noted that as a preferred arrangement the electromagnets 5, as well as the electromagnets 14 and 15, are double wound, being each provided with two coils bearing the relation of primary and secondary. For example, in Fig. 3 I have shown broken away portions of certain of these coils so as to illustrate the two windings, which windings are preferably in the form of a large or coarse primary wire and a fine secondary wire wound side by side. It should further be noted that the commutator 20 is provided not only with the contacts 21, 22, etc., but is also provided with another set of contacts 51, 52, 53, etc. These contacts 51, 52, 53, etc., are mounted and arranged similarly to the contacts 21, 22, 23, etc., and are almost but not quite diametrically opposite the same. The contacts 21, 22, 23, etc., are for the electromagnets 5, 14, 15 and are to energize and deenergize the same. The contacts 51, 52, 53, etc., are for the secondary or induction windings on said electromagnet windings 5, 14, 15 and are to open and close the circuit to such windings, thereby when such circuit is closed providing said electromagnets 5 with secondary circuits in which the currents set up upon making or breaking the circuits of said magnets, particularly the breaking thereof, flow and thus reduce the tendency to sparking. The collector 21^A is for the electromagnets 5, 14 and 15 and the secondary windings thereon.

Referring now to the diagram shown in Fig. 7, we have illustrated in said diagram the circuit of one cooperating pair of electromagnets 5, together with the circuit of the electromagnets 14 and 15 operating in connection with the same. It will be understood that the other circuits are similarly controlled by the commutators so as to produce the operation of the machine. In this figure we show two contacts which may be the contacts 21 connected by the conductor 21^a. A brush 31 is shown in contact with one contact 21 and connected with a wire 33 which is understood to run to the source of electrical energy, the device being used as a motor. The other brush 31 is connected to a conductor 60 which runs to the upper magnet 5, whence a conductor 61 runs to the lower magnet 5. From the latter a conductor 62 runs to the slip ring 21^c of the collector 21^A. From thence connection is made through the brush 47 by a conductor 63 to the rotor magnet 15 and thence by a conductor 64 to the other rotor magnet 14. Thence a conductor 65 is extended and connected with the other terminal of the source of electrical energy. Thus the circuit will be made through the stator magnets 5 and simultaneously through the rotor magnets 14 and 15, which it is understood are at the time in in a position to be attracted by said magnets 5. This attraction causes movement on the part of the magnets 14 and 15 and thereby causes movement on the part of the rotor.

The other or secondary windings of the magnets 5 and 14 and 15, are closed by means of the contacts 51 and brushes co-operating therewith, which brushes are not shown but are understood to be similar to the brushes shown in Fig. 4 and to be carried by a brush holder 29 on a support 31' on the upright 2, as illustrated in Fig. 2. The closure of the circuit through the secondary coils of the various magnets is understood to take place after the closure of the circuit through the magnetizing coils of said magnets, the contacts 51, 52, etc., being as stated, situated almost but not quite diametrically opposite the contacts 21, 22, etc. the difference being such as to permit the brushes 31 to connect with the contacts 21, 22, etc., before the other brushes connect with the contacts 51, 52, etc.

The circuit through these secondary windings may be traced in Fig. 7 by a conductor 67 extending from one of the brushes for a contact 51 to the secondary coil of the lower magnet 5 and thence by a conductor 68 to the upper magnet 5, and thence by a conductor 69 to the slip ring 21$^b$. From the latter the circuit is made by conductors 70 and 70$^a$. The conductor 70 extends to the lower rotor magnet 15 and thence by a conductor 71 to a return circuit 72, and thence back to the brush for the other contact 51. The conductor 70$^a$ extends to the upper rotor magnet 14, whence a conductor 73 extends back and makes connection with the aforesaid conductor 72, thus connecting the other magnet 14 with said other contact 51. In this way it will be seen the secondary circuits are all closed in series with one another, although of course the closure could be otherwise.

When the rotor is actuated by the attraction of the magnets 14 and 15 by one set of magnets 5, there will be a movement of such rotor and as a result of such movement the contacts 21 will move out of contact with the brushes 31, and later the contacts 51 of the secondary windings will move out of contact with their brushes. As a result the primary circuits of the magnets 5, 14, 15 are deenergized, and a moment later the secondary circuits of the magnets 5, 14 and 15 are deenergized. The rotor by reason of its momentum will continue to move and will bring the contacts 22 into connection with the cooperating brushes 31 so as to close the energizing circuits in the two magnets 5 next to the ones which have previously been energized and then deenergized. By the energizing of this second set of magnets 5, the magnets 14 and 15 will be attracted toward such second set and this attraction will be intensified by the energizing of said magnets 14 and 15 which occurs simultaneously with the energizing of the second set of magnets 5. This will cause a continuation of the movement of the rotor, the magnets 14 and 15 being attracted by and moving to said second set of magnets 5. After such energization the secondary circuits are closed and then the energizing circuits of said magnets 5, 14 and 15 are broken and the back electromotive force is taken up by such secondary circuits.

In this way the magnets 5 of the stator are energized in pairs one after the other, and the electromagnets 14 and 15 of the rotor are intermittently energized at the time of energization of each pair of stator magnets and thus there is a continually advancing magnetic field of force resulting in a continuous forward movement of the rotor. At the same time the back electromotive force caused by the breaking of the energizing or operating circuits is each time reduced owing to the closure of the secondary circuits and sparking reduced. The result is a continual rotation of the rotor and a continuous operation of the motor, and its commutation is improved by the taking up of the back electromotive force due to breaking the energizing circuits.

It will be understood that changes and modifications may be made without departing from the spirit of the invention.

What we claim is:

1. The combination of a stator and a rotor, said stator being provided with electromagnets of different lengths, the longer magnets being nearer the axis of the rotor and said magnets being provided with outwardly extending pole pieces the pole pieces of each of the magnets extending outwardly to the same distance from said axis, said rotor having electromagnets extending lengthwise of the electromagnets on the stator and having pole pieces extending toward one another lengthwise of the cores of said magnets and terminating opposite the pole pieces of said rotor magnets.

2. The combination of a stator and a rotor and cooperating electromagnets on said stator and said rotor, and induction coils on said magnets, together with means for energizing and deenergizing said magnets as required to produce rotation and also means for opening and closing said induction circuits.

3. The combination with a stator and a rotor, of cooperating electromagnets thereon and commutator means for energizing the stator magnets in a progressive manner and also for energizing the rotor magnets at times to cooperate with the stator magnets, together with induction circuits on said magnets, said commutator means including means for opening and closing said induction circuits.

4. The combination of a stator provided with a circularly arranged series of electromagnets and a rotor provided with magnets cooperating with said stator magnets, a commutator with circuit connections for energizing and deenergizing the stator magnets in progressive succession, and means for inductively including the rotor magnets in the circuits of the energized stator magnets.

5. The combination of a stator provided with a circularly arranged series of electromagnets and a rotor provided with magnets cooperating with said stator magnets, a commutator with circuit connections for energizing and deenergizing the stator magnets in progressive succession, and means for including the rotor magnets in the circuits of the energized stator magnets, together with induction coils on said magnets and means for opening and closing said induction circuits by said commutator.

6. The combination of a stator provided with a circularly arranged series of electromagnets and a rotor provided with magnets cooperating with said stator magnets, a commutator with circuit connections for energizing and deenergizing the stator magnets in progressive succession, and means for including the rotor magnets in the circuits of the energized stator magnets, together with induction coils on said magnets and means for opening and closing said induction circuits by said commutator, said commutator comprising a plurality of sets of contacts, two contacts in each set, said contacts of each set being connected together on the commutator, one series of said contact sets being for the stator magnets and the other series for the induction coils, and a pair of brush holders each provided with a plurality of brushes for the sets of contacts, the brushes of one brush holder being connected with the energizing coils of the stator magnets and the brushes of the other brush holder being connected with said induction coils, and said first mentioned means including rings and brushes for including the energizing coils of the rotor magnets in circuit with the energized coils of the stator, and for including the induction coils of the rotor magnets in circuit with the induction coils of the energized stator magnets.

7. The combination of a stator provided with a circular series of magnets, an annular magnetic member said magnets being secured to said annular magnetic member and extending transverse to said member with outwardly extending end pieces, a rotary shaft provided with a frame piece carrying a pair of diametrically located electromagnets having pole pieces located adjacent to but outside of the pole pieces of said stator magnets, and commutator means for causing a progressive energization of the stator magnets and for including the rotor magnets in the circuits of the energized stator magnets.

8. In combination, a stator and a rotor, said stator and rotor having, respectively, sets of primary and secondary windings thereon, a commutator for successively and intermittently energizing the primary windings of said stator and rotor, the primary windings of the stator being in series with the primary windings of the rotor, and the secondary windings of said stator and rotor being in series, and said commutator also controlling intermittent connection of said secondary windings to permit induced currents to flow therein.

9. In an electric motor, a rotor and an alternately energized and de-energized electromagnetic stator, a normally open induction coil upon said stator, and means for closing the circuit of said coil before said stator has been de-energized.

10. An electric motor having a rotor and an alternately energized and de-energized electro-magnetic stator, an induction coil upon said stator, and means for closing the circuit of said coil after said stator has been energized and for breaking said circuit after said stator has been de-energized.

In witness whereof, we hereunto subscribe our names this 22nd day of March A. D., 1918.

WILLIAM D. PENNINGTON.
JOHN R. PENNINGTON.